(12) United States Patent
Schumacher et al.

(10) Patent No.: US 8,085,156 B2
(45) Date of Patent: Dec. 27, 2011

(54) RF CAVITY-BASED PROCESS FLUID SENSOR

(75) Inventors: Mark S. Schumacher, Chanhassen, MN (US); Liangju Lu, Eden Prairie, MN (US)

(73) Assignee: Rosemount Inc., Eden Prairie, MN (US)

( * ) Notice: Subject to any disclaimer, the term of this patent is extended or adjusted under 35 U.S.C. 154(b) by 479 days.

(21) Appl. No.: 12/384,701

(22) Filed: Apr. 8, 2009

(65) Prior Publication Data

US 2010/0259362 A1   Oct. 14, 2010

(51) Int. Cl.
*G08B 21/00* (2006.01)
(52) U.S. Cl. .................. 340/612; 340/540; 340/603
(58) Field of Classification Search .............. 340/612
See application file for complete search history.

(56) References Cited

U.S. PATENT DOCUMENTS

| | | | |
|---|---|---|---|
| 4,051,728 A * | 10/1977 | Metz | 374/143 |
| 4,737,705 A | 4/1988 | Bitar et al. | |
| 5,942,991 A * | 8/1999 | Gaudreau et al. | 340/870.16 |
| 5,984,175 A * | 11/1999 | Popp | 235/375 |
| 6,104,291 A * | 8/2000 | Beauvillier et al. | 340/572.1 |
| 6,260,408 B1 | 7/2001 | Vig et al. | |
| 6,312,380 B1 | 11/2001 | Hock et al. | |
| 6,445,191 B1 * | 9/2002 | Trummer | 324/635 |
| 6,765,493 B2 | 7/2004 | Lonsdale et al. | |
| 6,897,775 B2 | 5/2005 | Elsner et al. | |
| 7,233,745 B2 | 6/2007 | Loechner | |
| 7,236,092 B1 | 6/2007 | Joy | |
| 7,330,271 B2 | 2/2008 | Frick | |
| 2007/0272209 A1 | 11/2007 | Matsiev et al. | |
| 2007/0290852 A1 * | 12/2007 | Trosper | 340/572.1 |
| 2009/0126483 A1 * | 5/2009 | Blendinger et al. | 73/304 C |

FOREIGN PATENT DOCUMENTS

| | | |
|---|---|---|
| EP | 0 940 738 | 12/2002 |
| EP | 1 293 853 | 3/2003 |
| EP | 1936339 A1 | 6/2008 |
| WO | 03/023536 | 3/2003 |

OTHER PUBLICATIONS

The International Search Report and Written Opinion of foreign application No. PCT/US2010/001031 filed Apr. 6, 2010.

* cited by examiner

*Primary Examiner* — George Bugg
*Assistant Examiner* — Kerri McNally
(74) *Attorney, Agent, or Firm* — Kinney & Lange, P.A.

(57) ABSTRACT

A remote system for sensing a process fluid parameter comprises a cavity, a tuner and a signal coupler. The cavity is configured to resonate at a central frequency that shifts in response to the process fluid parameter. The tuner is configured to tune the central frequency. The signal coupler is configured to receive a query signal, and to transmit an echo signal when the query signal matches the shifted central frequency.

22 Claims, 4 Drawing Sheets

RF CAVITY-BASED PROCESS FLUID SENSOR

BACKGROUND

This invention relates generally to fluid processing, and specifically to remote sensing systems for process fluid measurement and control. In particular, the invention concerns a passive sensor system for remote processing locations in which power consumption and communications requirements are significant design concerns.

Precise and accurate fluid measurements are essential to a wide range of processing applications, including bulk fluid storage and transport, food and beverage preparation, chemistry and pharmaceutical production, water and air distribution, environmental control, agriculture, hydrocarbon extraction, fuel refining, and a range of manufacturing processes utilizing thermoplastics, thin films, glues, resins and other fluidic materials. Many of these applications require sensor placement in remote, isolated or limited-access locations, or in processing environments subject to high temperatures, extreme pressures, explosive atmospheres, corrosive agents and other hazardous conditions.

In these applications, power consumption and communications requirements can influence system cost, and may impose limitations on overall system design. There is an ongoing need for remote sensing systems that address these power and communications concerns in a cost effective manner, and are appropriate to a wide range of remote, limited access and hazardous operating environments.

SUMMARY

This invention concerns a remote system for measuring process fluid parameters. The system comprises a cavity configured to resonate at a central resonance frequency, a tuner configured to tune the resonance frequency, and a signal coupler. The cavity comprises a waveguide or RF cavity resonator having a resonance frequency that shifts in response to thermodynamic (pressure or thermal) contact with a process fluid. The tuner is coupled to the cavity, and tunes the resonance frequency by adjusting the cavity's effective resonance length. The signal coupler is also coupled to the cavity, and is configured to transmit an echo when an incoming query signal matches the tuned and shifted resonance frequency.

DETAILED DESCRIPTION

Figure 1:
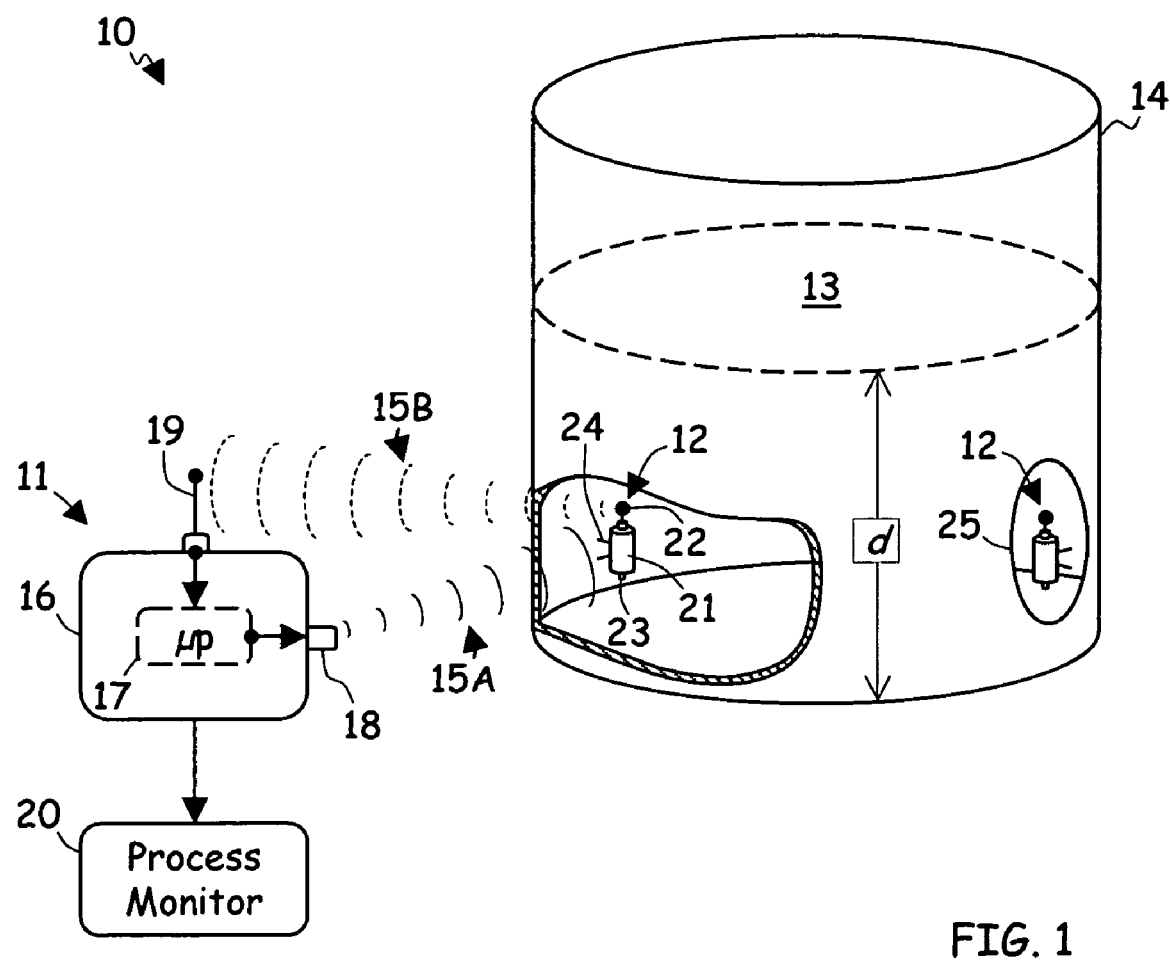
FIG. 1 is a cutaway schematic showing a remote sensor system for process fluid measurements, in a wireless embodiment.

FIG. 1 is a cutaway schematic showing remote sensor system 10 for process fluid measurements, in a wireless embodiment. System 10 comprises transmitter 11 and cavity-based process fluid sensors 12, which are in thermodynamic contact with process fluid 13 inside process reservoir 14. In this wireless embodiment, transmitter 11 and sensors 12 form a wireless link via RF (radio-frequency) query signals 15A, propagating from transmitter 11 to sensors 12, and RF response signals 15B, propagating from sensors 12 to transmitter 11.

Transmitter 11 comprises transmitter housing 16 with microprocessor/controller 17 (shown in dashed lines), signal broadcast element 18 and signal receive element 19. Housing 16 is formed from strong, durable, machinable materials such as aluminum, steel, stainless steel and other metals, from durable polymer materials such as PVC plastic or ABS plastic, or from a combination thereof. Housing 16 is shaped into a number of side walls, end walls, cover plates and other structures, which are assembled by mechanical means such as welds, screws or bolts. Housing 16 forms a protective enclosure for microprocessor 17 and the other internal components of transmitter 11, and provides a mounting body for external components including broadcast and receive elements 18 and 19. Typically, housing 16 also forms a fluid and pressure seal to protect the interior from leaks and from corrosive or explosive agents.

Controller 17 performs communications, control and signal processing functions for transmitter 11, including operation of broadcast and receive elements 18 and 19. Communications between transmitter 11 and process monitor/system controller 20 are provided via various hardware and wireless connections such as a loop wire or power/data bus, infrared (IR), optical or RF systems, or combinations thereof. Process communications also utilize a range of different command and control protocols including, but not limited to, standard analog (4-20 mA) protocols, hybrid analog-digital protocols such as HART®, and digital protocols such as Foundation™ Fieldbus and PROFI®BUS/PROFI®NET protocols. A range of transmitters and other field devices utilizing these representative communications systems are available, for example, from Rosemount Inc. of Chanhassen, Minn., an Emerson Process Management company.

In the wireless embodiment of FIG. 1, signal broadcast element 18 comprises an RF broadcast antenna for transmitting wireless RF query signals 15A to sensors 12, and signal receive element 19 comprises an RF receiver antenna for acquiring wireless response signals 15B from sensors 12. In some embodiments, broadcast and receive elements 18 and 19 are distinct, as shown in FIG. 1, and in other embodiments elements 18 and 19 are combined into a single transceiver device with both broadcast (signal transmission) and reception (signal acquisition or collection) functions.

RF signals 15A and 15B encompass a wide range of frequency and wavelength bands, including microwaves, shortwave radio signals, high frequency radio signals and ultrahigh frequency radio signals. In typical embodiments, RF signals 15A and 15B range in frequency from about 300 MHz to about 30 GHz, corresponding to vacuum wavelengths from about one centimeter (1 cm) to about one meter (1 m). In extended-range embodiments, RF signals 15A and 15B range in frequency from about 30 MHz to about 300 GHz, and in vacuum wavelength from about one millimeter (1 mm) or less to about ten meters (10 m) or more.

Sensors 12 are cavity-based sensors for process fluid measurements, each comprising resonator cavity 21, signal coupler 22 and cavity tuner 23. Sensors 12 are positioned such that cavity resonator 21 is in thermodynamic contact with process fluid 13, for instance by utilizing sensor mount 24, which positions sensors 12 inside reservoir 14 at least partially within fluid 13.

Process fluid 13 is typically a bulk liquid stored in reservoir 14, such as water, ammonia, a chemical solvent or other chemical solution, or a fluid hydrocarbon fuel. In alternate embodiments, reservoir 14 represents an oil dome or other natural reservoir, in which sensors 12 are typically utilized in a cabled embodiment (see FIG. 2A) for a down-hole applications. In further embodiments, reservoir 14 represents a pressure vessel, a processing vessel, a flow conduit, a flow pipe, or another element of a fluid extraction, storage, transportation, or processing system, and fluid 13 is in liquid, gaseous or multi-phase form.

In wireless embodiments, reservoir 14 is sometimes formed of a material that is relatively permeable to RF signals, such as plastic or another polymer material. In these embodiments, signals 15A and 15B propagate through the wall of reservoir 14, as shown in FIG. 1. Alternatively, reservoir 14 is provided with one or more RF permeable windows 25, which are positioned to allow wireless RF communications between transmitter 11 and one or more sensors 12.

Thermodynamic contact between sensors 12 and process fluid 13 encompasses both thermal contact and pressure contact, such that sensors 12 are subject to the pressure and thermal conditions of process fluid 13 at the location of cavity resonator 21. In some embodiments, thermodynamic contact between sensors 12 and process fluid 13 also provides differential pressure sensitivity, such that sensors 12 are responsive to differential pressure effects along cavity resonator 21, including differential pressure effects due to fluid flow.

Each cavity-based remote sensor 12 has a central resonance frequency that depends upon the geometrical properties of cavity resonator 21. These geometrical properties are described, for example, by an effective resonance length. When sensor 12 is positioned in thermodynamic contact with fluid 13, the effective resonance length varies, such that the central resonance frequency shifts in response to the thermodynamic properties of fluid 13. In particular, the effective resonance length and central resonance frequency shift or vary in response to pressure, temperature and flow rates along or proximate cavity resonator 21.

In one embodiment, for example, sensor 12 comprises a level sensor and the effective resonance length of cavity 21 shifts in response to the local absolute or gage pressure of fluid 13. The pressure, in turn, is a function of density, fluid depth d with respect to the relative height of sensor 12, and external overpressure. In other embodiments, the geometry of cavity 21 changes in response to a differential pressure, or in response to a temperature or flow rate within process fluid 13.

To measure the relevant process fluid parameter, transmitter 11 scans query signal 1 5A across a range of frequencies defined about the central resonance of cavity 21. Signal coupler 22 receives query signal 15A and transmits the signal energy to cavity 21. When query signal (or sampling signal) 15A matches the shifted resonance frequency, sensor 12 is driven at resonance and the electromagnetic energy within cavity 21 increases. Cavity 21 is designed as a high-Q system in order to reduce absorption, so that a substantial portion of the incoming energy is re-broadcast (or re-transmitted) via signal coupler 2 to create echo signal (or response signal) 15B. That is, signal coupler 22 couples cavity 21 to the electromagnetic field of query signal (sampling signal) 15A, and generates response signal (echo signal) 15B by scattering at the resonance.

As shown in FIG. 1, RF signals 15A and 15B are directional, with a particular sense of propagation along the general direction between transmitter 11 and sensor 12. In other embodiments, transmitter 11 and sensor 12 generate dipole-type electromagnetic radiation fields, in which RF signals 15A and 15B are substantially rotationally symmetric about antennas 19 and 23. In further embodiments, signals 15A and 15B are characterized by substantially isotropic radiation fields. Alternatively, signals 15A and 15B are delivered along a cable or other conductor, rather than generally broadcast through the environment, as described below with respect to FIGS. 2A and 2B.

By scanning the query signal until a response or scattered echo signal is obtained, transmitter 11 determines the shifted resonance frequency of sensor 12. The shifted resonance frequency is determined by the effective resonance length of resonant cavity 21, which in turn depends upon thermodynamic contact with process fluid 13. Thus the shifted resonance frequency is a function of the pressure, temperature, flow rate and other process variables that describe process fluid 13.

FIG. 1 illustrates a number of advantages of system 10. First, sensor 12 is directly responsive to pressure, temperature, flow and other process variables or fluid parameters, due to the direct geometric response of cavity 21 to thermodynamic contact with process fluid 13. This contrasts with electromechanical pressure transducers and circuit-based resonators, which rely on piezoelectric elements, L-C or L-R-C components, and other devices that rely upon indirect thermal and mechanical effects, rather than on a direct relationship between frequency and cavity geometry.

In addition, sensor 12 and resonator cavity 21 operate on the principles of electromagnetic resonance, rather than acoustic or mechanical resonance. This distinguishes from surface acoustic wave (SAW) sensors, acoustic strain gauge sensors, and boundary acoustic wave techniques. In addition, sensor 12 does not require a power supply. Instead, transmitter 11 interrogates sensor 12 via query signal 15A, and, when resonance occurs, sensor 12 simply reflects or scatters the query signal to produce echo or response signal 15B, without additional power input. Transmitter 11 then determines the relevant process parameter based on echo signal 15B, where the resonant scattered frequency is a function of the pressure, temperature and flow within process fluid 13, based on the geometrical response of cavity 21.

Figure 2A:
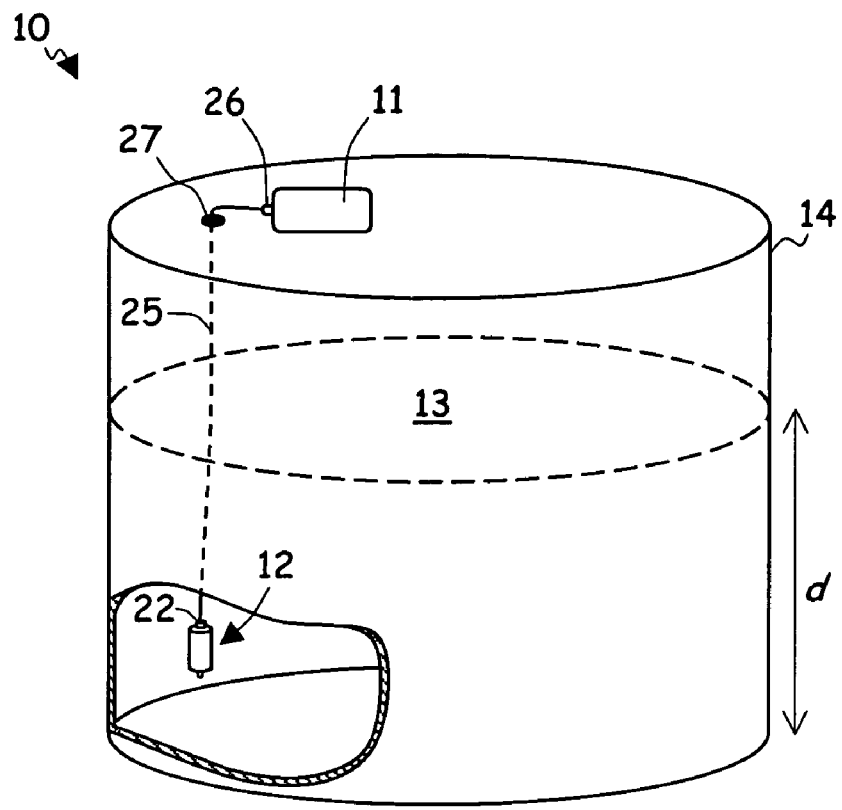
FIG. 2A is a cutaway schematic showing the remote sensor system of FIG. 1, in a cabled embodiment.

FIG. 2A is a cutaway schematic showing remote sensor system 10 in a cabled embodiment. In this embodiment, transmitter 11 and sensor 12 communicate query and response signals via RF cable 25 (shown partly in dashed lines). This contrasts with the wireless embodiment of FIG. 1, in which the query and response signals are freely-propagating broadcast fields that travel between transmitter 11 and sensor 12 through process fluid 13 and the ambient environment of system 10.

Cabled embodiments of transmitter 11 typically comprise cable connector/transceiver 26, which combines the functions of independent broadcast and receive elements 18 and 19 of FIG. 1, above, and provides electrical and mechanical couplings to cable 25. In these embodiments, signal coupler 22 of sensor 12 typically comprises a cable connector. The cable connecter performs analogously to the antenna-type coupler of FIG. 1, by coupling cavity 21 to the electromagnetic field inside cable 25, as opposed to a freely-propagating (wireless) broadcast field.

Cable 25 comprises a coaxial cable, waveguide, high-frequency transmission line or similar structure with low impedance in the frequency range of query and response signals between transmitter 11 and sensor 12. In typical embodiments, cable 25 is insulated and shielded from external radiation, in order to increase the signal-to-noise ratio of the echo signal.

In the particular embodiment of FIG. 2A, cable 25 enters reservoir/process structure 14 at port 27, which provides a pressure or fluid seal for reservoir 14. Alternatively, port 27 is open, and provides a pressure or fluid vent.

Cabled embodiments of system 10 are appropriate for shielded sensor locations including down-hole applications, and for embodiments in which process fluid 13 or reservoir 14 would substantially attenuate freely propagating query and response signals. Cabled embodiments are also applicable in RF-noisy and RF-sensitive operating environments, where openly-broadcast RF query and response signals would either cause or be subject to interference, or would create safety or security concerns.

Figure 2B:
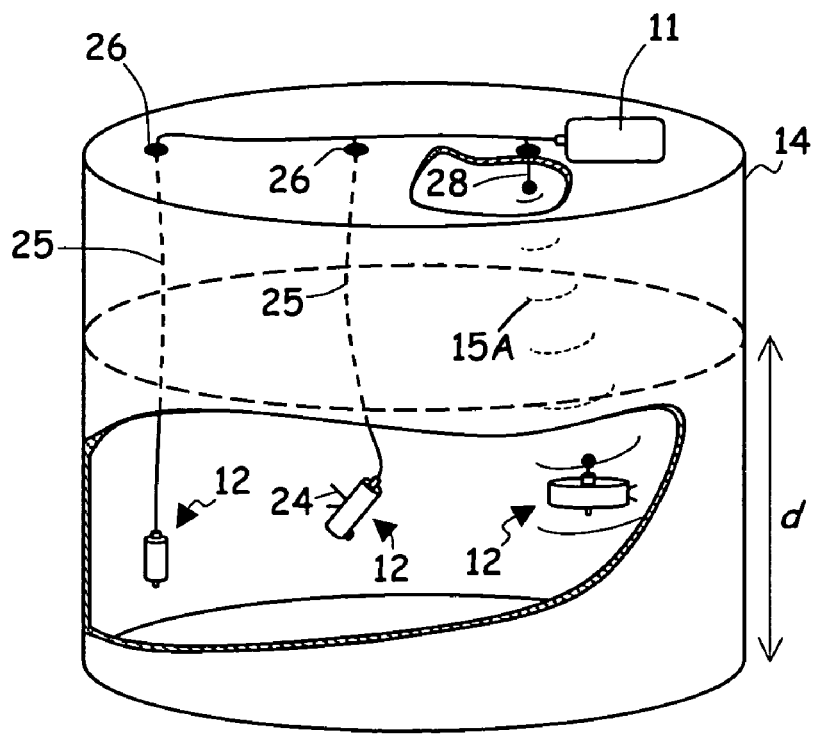
FIG. 2B is an alternate cutaway schematic showing the remote sensor system of FIG. 1, in an embodiment utilizing both cabled and wireless sensors.

FIG. 2B is an alternate cutaway schematic view of system 10, in an embodiment utilizing both cabled and wireless sensors 12. In this embodiment, transmitter 11 communicates with sensors 12 utilizing a combination of signal cables 25 and freely-propagating broadcast and response signals. Sensors 12 are supported within fluid 13 via sensor mounts 24, or suspended via signal cables 25.

In some embodiments, transmitter 11 sends and receives query and response signals via secondary antenna 28. Secondary antenna 28 is a transceiver antenna with combined transmit and receive functionality, located inside reservoir/process structure 14. Like RF window 25 of FIG. 1, secondary antenna 28 provides an alternate means of signal communication when reservoir 14 is formed of an RF-impermeable material such as metal.

As illustrated by FIG. 2B, signal cables 25 exhibit both series ("daisy-chained") and parallel configurations, in which some segments of cables 25 provide transmission paths to a number of different sensors 12, and other segments of cables 25 are dedicated to a single sensor 12. In further embodiments, system 10 utilizes any combination of parallel and series sensor configurations, and any combination of cable-based (transmission line) and freely-propagating (broadcast) query and response signals.

To distinguish among a number of different sensors 12, transmitter 11 sometimes utilizes time-shifted or "ΔT" measurements, which depend upon the time difference or delay between query and response signals. The delay depends upon the round-trip signal transmission pathlength (S) between transmitter 11 and sensor 12, and on the velocity (v) of signal propagation:

$$\Delta T = \frac{S}{v}. \quad [1]$$

For freely propagating electromagnetic waves in air and other relatively "thin" media (i.e., with index of refraction n near one), velocity v approaches the speed of light in vacuum (v≈c) and pathlength S is approximately twice the line-of-sight distance between transmitter 11 and sensor 12. In general, however, signal velocity v depends upon the index of refraction (that is, v=c/n), and in general the index of refraction depends upon the signal frequency. In addition, pathlength S is sometimes defined along a signal cable, rather than the line of sight.

To account for these more general configurations, pathlength S is defined as the integral of the index of refraction over the actual signal path. That is, $$\Delta T = \frac{1}{c} \oint_P n \, ds, \quad [2]$$

where P is the closed-loop signal path from transmitter 11 to sensor 12 and back again, including any combination of path segments along signal cable(s) 25 and freely-propagating (broadcast) segments through process fluid 13, process structure 14, or other components of the ambient environment surrounding system 10.

In some embodiments, each individual sensor 12 is characterized by a substantially unique effective pathlength and corresponding delay ΔT, and transmitter 11 distinguishes among sensors on this basis. In other embodiments, sensors are also distinguished by cavity tuning, as described in more detail below. In typical embodiments, therefore, transmitter 11 is configured to distinguish among individual sensor 12 by a combination of time-delay and cavity tuning, providing independent, redundant and complementary means of sensor identification.

FIG. 2B also illustrates that sensors 12 are configurable in a variety of horizontal, vertical and intermediate angular orientations. In the horizontal embodiment, opposing ends of sensor 12 are subject to essentially the same average pressure due to depth d of process fluid 13. In angled or vertical orientations, there is also a differential pressure effect due to the variable depth of fluid 13 along the cavity resonator.

Figure 3A:
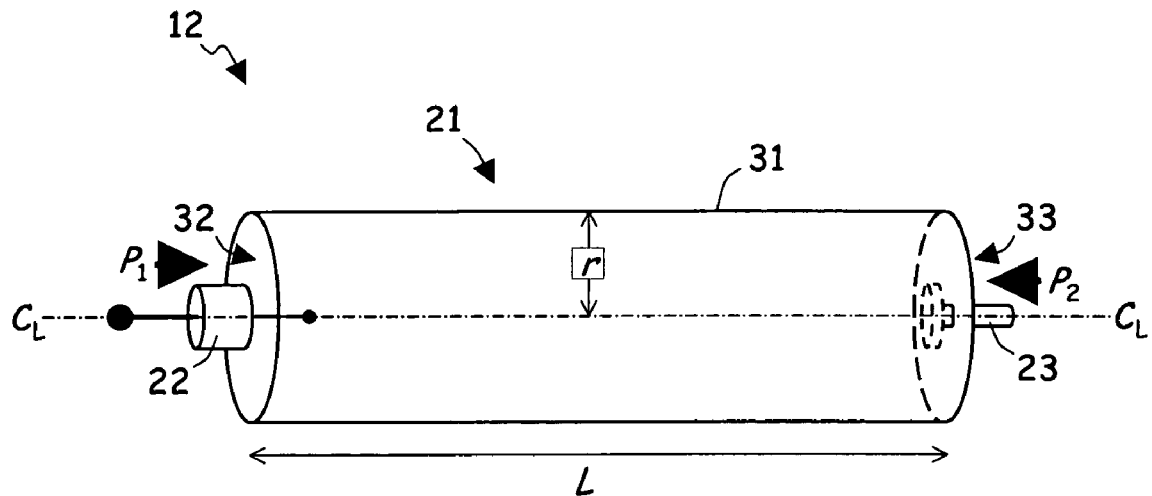
FIG. 3A is a perspective view of a remote sensor for the system of FIG. 1, in a wireless embodiment with a cylindrical cavity resonator.
Figure 3B:
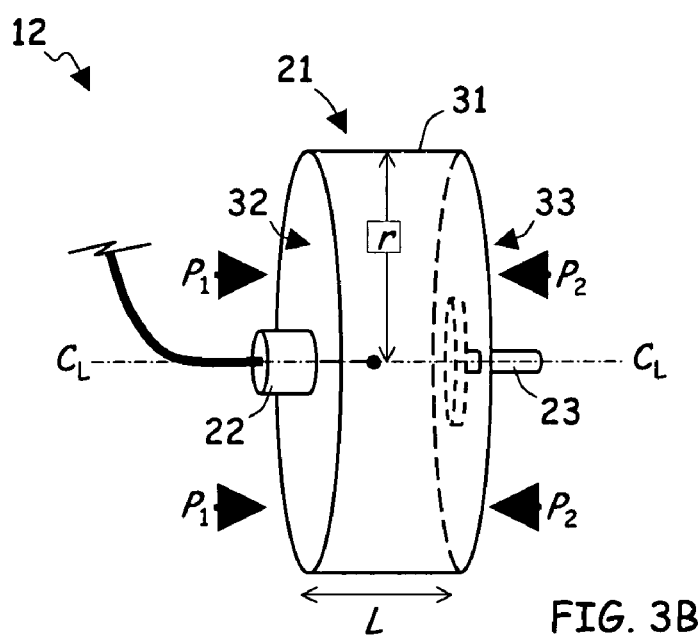
FIG. 3B is an alternate perspective view of the remote sensor in FIG. 3A, in a cabled embodiment with a different longitudinal aspect ratio.

FIGS. 3A and 3B are perspective views of remote sensor 12, showing cavity resonator 21 in a cylindrical embodiment. Sensor 12 comprises cavity resonator 21, signal coupler 22 and tuner 23. FIG. 3A shows remote sensor 12 in a wireless embodiment, in which signal coupler 22 comprises an antenna, and FIG. 3B shows a cabled embodiment, in which signal coupler 22 comprises a cable connector and cavity 21 has a different aspect ratio.

Cavity resonator 21 comprises cavity or waveguide body 31 with first and second opposing reflectors (reflecting end walls) 32 and 33. In some embodiments, cavity 21 is a vacuum resonator cavity, which as used herein encompasses air-filled and other relatively low-density fluid-filled resonator cavities, such that the index of refraction within the cavity is approximately unity (that is, n≈1). In these embodiments, cavity 21 typically maintains a pressure seal to prevent fluid inflow and outflow along the boundaries between waveguide body 31 and reflectors/end walls 32 and 33, and at signal coupler 22 and tuner 23.

Cavity 21 is configured to exhibit good conductivity and reflectivity with low losses in a frequency region surrounding a strongly peaked resonance. That is, resonator 21 is a high-Q cavity, where the Q-factor (or "quality") of the resonator is defined below.

Reflectors/end walls 32, 33 are typically formed of conducting and RF-reflecting metals or metal alloys, such as copper, steel or aluminum. In some embodiments, reflectors 32 and 33 are formed of a highly polished material with a low-resistivity coating such as silver, in order to further increase conductivity and reflectivity.

In additional embodiments, reflectors/ends walls 32 and 33 are formed of another material, such as a plastic or other durable polymer, which is coated or plated with a metal or metal alloy, including highly conductive and RF-reflecting materials such as silver and gold. In these embodiments, the materials of reflectors/end walls 32 (and other components of sensor 12) are sometimes selected to reduce the effects of thermal expansion, in order to increase independent sensitivity to pressure effects. Suitable materials with low coefficients of thermal expansion include float glass and optical glass ceramics, some of which have thermal expansion coefficients of approximately zero.

Cavity body 31 is disposed between opposing reflectors 22 and 23, such that cavity 21 defines an electromagnetic waveguide with effective longitudinal resonance length L. In the embodiments of FIGS. 3A and 3B, for example, longitudinal dimension L is defined between reflectors 22 and 23 along axial centerline $C_L$.

The effective longitudinal resonance length determines the lowest value of the central resonance frequency for substantially longitudinal modes. That is, $$f_0 = \frac{c}{2nL}, \quad [3]$$

where n is the index of refraction. The index of refraction is a function of frequency f, but the frequency dependence is typically small in the region surrounding resonance.

Because sensor 12 is in thermodynamic contact with a process fluid, cavity 21 is subject to pressure, temperature and flow effects, which change the geometry of cavity 21 and shift the central resonance frequency. That is, the central resonance frequency of cavity 21 shifts as a function of thermodynamic contact with the process fluid.

When cavity 21 is in pressure contact with a fluid, first reflector/end wall 32 is subject to pressure $P_1$ and second reflector/end wall 33 is subject to pressure $P_2$. As a result, reflectors/end walls 32 and 33 tend to flex, changing the effective resonance length and shifting the central resonance frequency as a function of the pressure inside the process fluid.

In some embodiments, sensor 12 has a substantially horizontal orientation, such that pressures $P_1$ and $P_2$ are equal and sensor 12 is responsive to an absolute pressure. In other embodiments, including vertical and angled orientations, pressures $P_1$ and $P_2$ differ and sensor 12 is responsive to a differential pressure. In further embodiments, one or both of reflectors/end walls is in pressure contact with an external reference, and sensor 12 is responsive to a gage pressure or absolute pressure.

In additional embodiments, there is fluid flow along cavity body 31. In these embodiments, sensor 12 responds to the Bernoulli effect and other flow-dependent contributions to a pressure differential across end walls 32 and 33. To improve response, sensor 12 is sometimes installed across a flow obstruction or flow constriction configured to increase differential pressure and flow sensitivity.

In general, the thermodynamic contact between cavity 21 and fluid 13 includes thermal contact, and cavity 21 tends to approach the process fluid temperature. In this case, both the longitudinal resonance length (L) and the radius (r) are also functions of temperature, which provides an additional contribution to the shift in resonance frequency.

The magnitude of the various pressure, temperature and flow dependencies are determined by the geometry and orientation of cavity 21, and by the coefficient of thermal expansion of body 31 and end walls 32, 33. In typical sealed embodiments, for example, the effects of thermal expansion are relatively low, as compared to the effects of pressure, and sensor 12 operates substantially as a pressure sensor. In embodiments using materials with very low coefficients of thermal expansion, moreover, such as zero thermal expansion coefficient materials, thermal effects can be reduced or substantially eliminated. In unsealed embodiments, on the other hand, fluid is free to flow into and out of cavity 21, such that the internal and external pressures equilibrate. In these embodiments, pressure has less effect on cavity geometry and sensor 12 operates substantially as a temperature sensor.

The resonance condition for cavity 21 is determined by central resonance frequency $f_0$, as shifted by thermodynamic contact with the process fluid, and by resonance width ($\Delta f$), which determines the range of frequencies about $f_0$ at which cavity 21 will exhibit resonant oscillations. The ratio of the central resonance frequency ($f_0$) divided by the full width of the resonance ($\Delta f$) determines the quality factor of the cavity. That is, $$Q = \frac{f_0}{\Delta f}, \quad [4]$$

where $\Delta f$ is the full width at half maximum (FWHM), as defined across central resonance frequency $f_0$ at half maximum energy.

Typically, oscillator energy goes as the square of the amplitude, such that resonance width $\Delta f$ is also the full width of the resonance at half the maximum amplitude squared. For high-Q cavities such as cavity 21, moreover, the Q-factor is approximately two pi ($2\pi$) times the ratio of energy stored ($E_0$) to energy dissipated ($\Delta E$) per cycle. Thus:

$$Q = 2\pi \frac{E_0}{\Delta E}. \quad [5]$$

Because cavity 21 has high Q, it is not excited to resonance until the query signal matches central resonance frequency $f_0$ to high accuracy. This provides for precise measurement of central resonance frequency $f_0$, and precise measurement of the thermodynamic properties (e.g., pressure, temperature or flow) of the process fluid. High-Q cavities also exhibit low energy dissipation (low loss), so that more energy is available for the response signal or "echo".

When sensor 12 is excited to resonance, the electromagnetic energy stored in cavity 21 increases substantially. Some of this energy is re-transmitted into the electromagnetic field via signal coupler 22, either along a signal cable (e.g., via a cable connector) or in the form of a freely-propagating electromagnetic wave (e.g., via an antenna). At resonance (when the incident query signal matches the resonance frequency), cavity 21 acts as a strong scatterer, which reflects the query signal back to the transmitter.

The scattered RF energy creates an echo or response signal when the cavity is on resonance (that is, when the query signal matches the shifted resonance frequency). A cavity is typically on resonance when the frequency of the query signal falls within the FWHM of central resonance frequency $f_0$, or at most within a few times the FWHM. When the incident query signal does not fall in this range, the cavity is off resonance (that is, the query signal does not match the shifted resonance frequency), and scattering is significantly decreased. Off resonance, that is, the echo/response signal is either substantially attenuated, or essential absent (that is, not normally detectable).

Figure 4A:
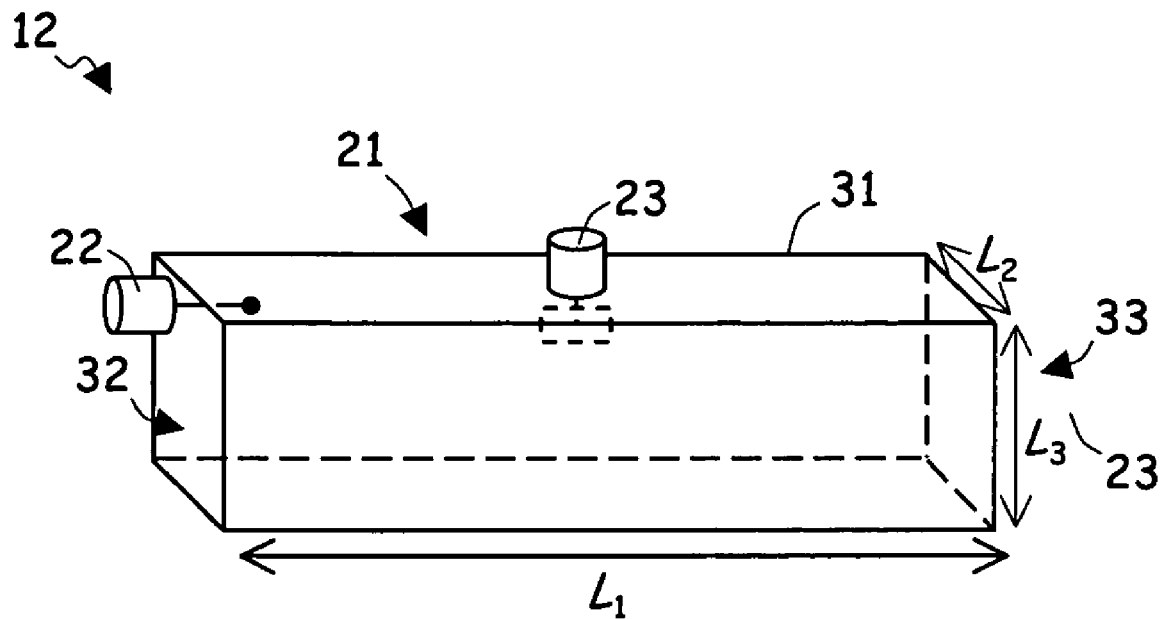
FIG. 4A is a perspective view of a rectangular resonator for the remote sensor system of FIG. 1.
Figure 4B:
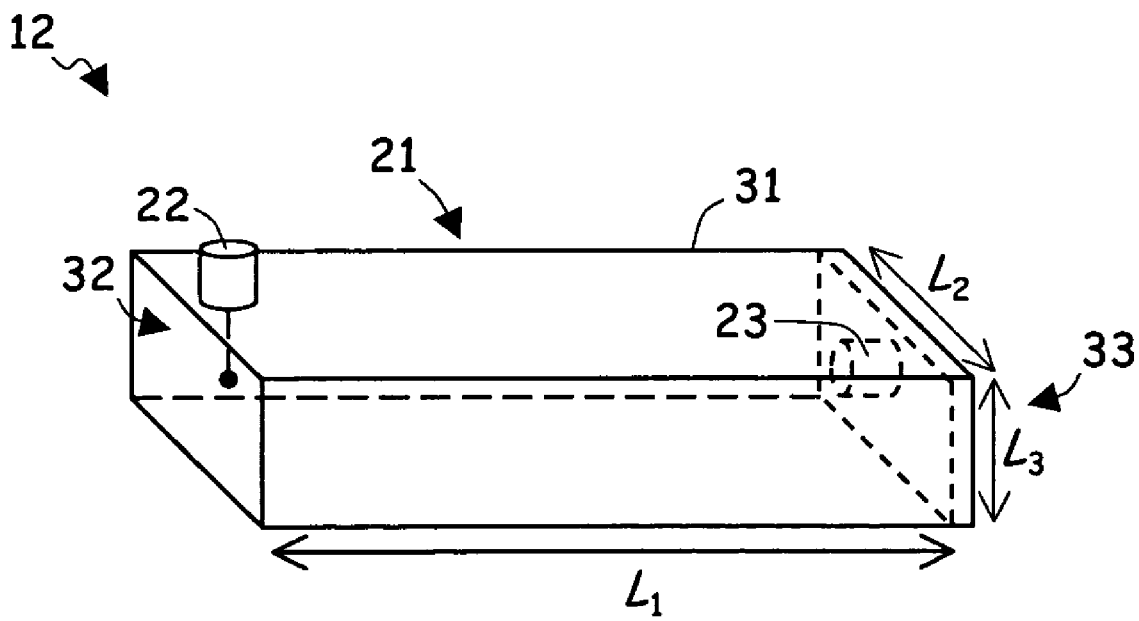
FIG. 4B is an alternate perspective view of the rectangular resonator in FIG. 4A, in an embodiment with an arbitrary transverse aspect ratio.

FIGS. 4A and 4B are alternate perspective views of sensor 12, in rectangular cavity embodiments. FIG. 4A shows cavity 21 with a generally square cross section and approximately 1:1 transverse aspect ratio. FIG. 4B shows cavity 22 with a rectangular cross section and arbitrary transverse aspect ratio.

FIGS. 3A, 3B, 4A and 4B are illustrative of a wide range of different cavity resonator configurations, in which antenna/cable connector 22 and frequency tuner/wavelength adjuster 23 are connected either to cavity body 31 or reflectors/end walls 32 and 33. In addition to the circular and rectangular cross sections shown here, cavity body 31 also has spherical embodiments, in which reflectors/ends walls 32, 33 are diametrically opposed portions of the sphere, coaxial embodiments, and other, more generalized waveguide, resonator and cavity-based geometries.

In some of these embodiments, both reflectors 22, 23 and cavity walls 31 comprise reflective materials. In these embodiments, the typical propagation modes are transverse electric (TE) and transverse magnetic (TM) modes, and the effective resonance length depends upon a number of different geometrical factors. In the rectangular geometry of FIGS. 4A and 4B, for example, the central resonance frequencies for transverse modes are:

$$f_0(m,n) = \frac{c}{2n}\sqrt{\frac{n_1^2}{L_1^2} + \frac{n_2^2}{L_2^2} + \frac{n_3^2}{L_3^2}}, \quad [5]$$

where $L_1$, $L_2$ and $L_3$ are the length, width and height of the cavity, in no particular order, and mode numbers $n_1$, $n_2$ and $n_3$ correspond to the number of half-wavelengths along dimensions $L_1$, $L_2$ and $L_3$.

In rectangular configurations, the effective resonance length depends upon individual lengths $L_1$, $L_2$ and $L_3$, and on the mode of propagation:

$$L(m,n) = \left(\frac{n_1^2}{L_1^2} + \frac{n_2^2}{L_2^2} + \frac{n_3^2}{L_3^2}\right)^{-1/2}. \quad [6]$$

In the first longitudinal mode ($n_1=1$), with length $L_1$ substantially less than both $L_2$ and $L_3$ ($L_1 \ll L_2$ and $L_2 \ll L_3$), Eq. 6 reduces to $L \approx L_1$. This is the same result as for the substantially longitudinal modes in a two-reflector cavity, as described above. For cylindrical cavities with relatively large radius r, the longitudinal resonance length is also approximately equal to the axial length L.

For non-longitudinal oscillations, on the other hand, the resonance length depends upon more than one cavity dimension, and the functional forms can be complex. Nonetheless, an effective resonance length can be uniformly defined as one-half the wavelength of the lowest-frequency resonance (or other relevant mode). The effective resonance length, moreover, remains dependent upon cavity geometry, regardless of its particular functional form. This allows process variables (including pressure and temperature) to be determined from the shift in resonance frequency, because the shift depends on cavity geometry and cavity geometry depends on the process variables.

Tuner 23 comprises an adjustable tuner or wavelength shifting element that alters the geometry of one or more of cavity body 31 and reflectors 32 and 33. This changes the central resonance frequency of cavity 21, independently of thermodynamic effects, and allows individual sensors to be identified.

In some embodiments, tuner 23 tunes the central resonance of cavity 21 by changing its effective resonance length, and tuner 23 is a wavelength shifting device. In other embodiments, tuner 23 changes the mode structure of the resonance, and is a mode shifting device. In typical embodiments, however, tuner 23 has both wavelength shifting and mode shifting functions.

As shown in the representative illustrations of FIGS. 3A, 3B, 4A and 4B, tuner 23 takes on a number of different forms, including, but not limited to, posts, tubes, rods and other substantially cylindrical members, screens, plates, walls, reflectors and other substantially planar members, and combinations thereof. Tuner 23 sometimes adjusts the orientation or position of a reflecting or absorbing body within cavity body 31, as shown in FIG. 4A, and sometimes adjusts the orientation or position of one or more of reflectors 32 or 33, as shown in FIG. 4B. In further embodiments, tuner 23 combines these functions, as shown in FIGS. 3A and 3B.

Typically, tuner 23 is used to tune a number of individual resonators 21 into a series of frequency bands, such that the bands do not substantially overlap as a function of thermodynamic contact with the process fluid. This decouples cavity identification from measurement sensitivity, so that each cavity sensor 12 has an individual tuning band, with the process parameters determined from shifts within each band. This allows a plurality of different sensors 12 to be identified by distinct and non-overlapping response signal ranges or tuning bands, each uniquely determined by tuner 23. In other embodiments, individual sensors are also identified by time delay ($\Delta T$), as described above, providing a redundant means of sensor identification.

Although the present invention has been described with reference to preferred embodiments, the terminology used is for the purposes of description, not limitation. Workers skilled in the art will recognize that changes may be made in form and detail without departing from the spirit and scope of the invention.

The invention claimed is:

1. A remote system for sensing a process fluid parameter, the system comprising:
   a cavity configured to resonate at a cavity frequency that shifts in response to the process fluid parameter;
   a tuner coupled to the cavity in order to tune the cavity frequency;
   a signal coupler coupled to the cavity in order to receive a query signal and transmit an echo signal when the query signal matches the cavity frequency, the signal coupler comprising an antenna configured to receive microwaves and conduct the microwaves to the cavity; and
   a transmitter configured to transmit the query signal to the signal coupler by broadcasting the microwaves to the cavity, the transmitter further configured to receive the echo signal from the signal coupler and measure the process fluid parameter as a function of the echo signal.

2. The system of claim 1, wherein the process fluid parameter comprises a pressure.

3. The system of claim 1, wherein the transmitter is further configured to identify the system as a function of the echo signal.

4. The system of claim 3, wherein the transmitter is further configured to identify the system as a function of a time delay between the query signal and the echo signal.

5. The system of claim 1, wherein the transmitter comprises a secondary antenna for broadcasting the microwaves to the cavity inside a conducting process structure.

6. The system of claim 1, wherein the signal coupler comprises a cable connector configured to conduct the query signal from the cable to the cavity and to conduct the echo signal from the cavity to the cable.

7. The system of claim 1, wherein the cavity is formed of a conducting material and has an interior index of refraction of about one.

8. A remote sensor for process fluid, the sensor comprising:
- an RF vacuum resonator in thermodynamic contact with the process fluid, such that a resonant frequency of the resonator is a function of the thermodynamic contact;
- a frequency tuner coupled to the resonator, such that the resonant frequency is a further function of a position of the frequency tuner; and
- a coupler coupling the resonator to an RF signal, such that the sensor generates a response when the resonator is excited at the resonant frequency;
- wherein the function of the position of the frequency tuner has a substantially greater range than the function of the thermodynamic contact and is substantially decoupled from the function of the thermodynamic contact.

9. The sensor of claim 8, wherein the resonant frequency is between approximately one hundred megahertz and approximately one hundred gigahertz.

10. The sensor of claim 8, wherein the coupler comprises an RF antenna.

11. The sensor of claim 8, wherein the coupler comprises an RF cable connector.

12. The sensor of claim 8, wherein the thermodynamic contact comprises pressure contact.

13. The sensor of claim 12, wherein the pressure contact depends upon flow in the process fluid.

14. The sensor of claim 12, wherein the resonator is comprised of a material with substantially zero coefficient of thermal expansion.

15. The sensor of claim 8, wherein the thermodynamic contact comprises temperature contact.

16. A cavity sensor for a process fluid, the cavity sensor comprising:
- first and second opposing reflectors;
- a waveguide disposed between the first and second reflectors to define a cavity length therebetween, wherein the cavity length is a function of thermodynamic contact with the process fluid;
- a wavelength adjuster attached to the waveguide to adjust the cavity length independently of the thermodynamic contact; and
- a signal coupler coupling the waveguide to an electromagnetic field having a wavelength, such that the cavity sensor strongly scatters the electromagnetic field when the wavelength corresponds to the cavity length.

17. The cavity sensor of claim 16, wherein the waveguide defines a cavity length between approximately one millimeter and approximately one meter.

18. The cavity sensor of claim 16, wherein the cavity length is a substantially longitudinal effective resonance length.

19. The cavity sensor of claim 16, wherein the cavity length is a substantially transverse effective resonance length.

20. The cavity sensor of claim 16, wherein the signal coupler comprises a cable connector for coupling the waveguide to the electromagnetic field inside a signal cable.

21. A remote system for sensing a process fluid parameter, the system comprising:
- a cavity configured to resonate at a cavity frequency that shifts in response to the process fluid parameter;
- a tuner coupled to the cavity in order to tune the cavity frequency;
- a signal coupler coupled to the cavity in order to receive a query signal and transmit an echo signal when the query signal matches the cavity frequency, the signal coupler comprising a cable connector configured to conduct the query signal from a cable to the cavity and to conduct the echo signal from the cavity to the cable; and
- a transmitter configured to transmit the query signal to the signal coupler, receive the echo signal from the signal coupler and measure the process fluid parameter as a function of the echo signal.

22. A remote system for sensing a process fluid parameter, the system comprising:
- a cavity configured to resonate at a cavity frequency that shifts in response to the process fluid parameter;
- a tuner coupled to the cavity in order to tune the cavity frequency; and
- a signal coupler coupled to the cavity in order to receive a query signal and transmit an echo signal when the query signal matches the cavity frequency;
- wherein the cavity is formed of a conducting material and has an interior index of refraction of about one.

* * * * *